Jan. 11, 1949.  J. A. CUMMINGS ET AL  2,458,568
POTATO SEED CUTTER
Filed March 19, 1948  3 Sheets-Sheet 1

John A. Cummings
Frank B. Cummings
INVENTORS

Jan. 11, 1949.   J. A. CUMMINGS ET AL   2,458,568
POTATO SEED CUTTER
Filed March 19, 1948   3 Sheets-Sheet 2

John A. Cummings
Frank B. Cummings
INVENTORS

BY *Clarence A. O'Brien*
and *Harvey B. Jackson*
Attorneys

Jan. 11, 1949. J. A. CUMMINGS ET AL 2,458,568
POTATO SEED CUTTER
Filed March 19, 1948 3 Sheets-Sheet 3
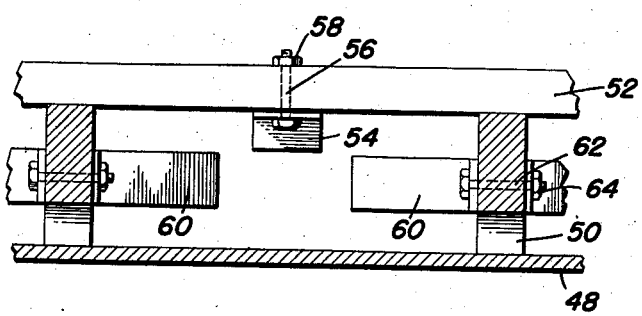
Fig. 5.
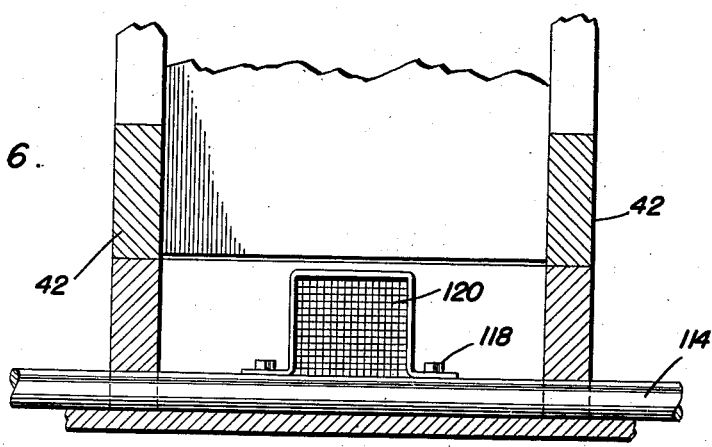
Fig. 6.
Fig. 7.
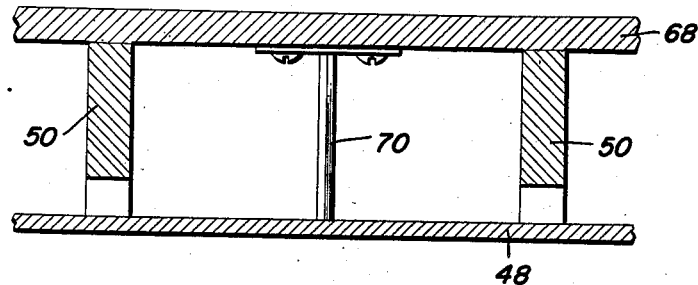
Fig. 8.
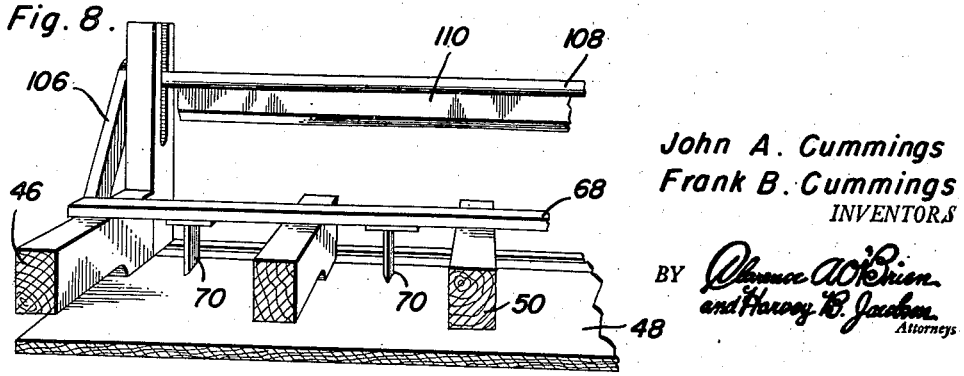
John A. Cummings
Frank B. Cummings
INVENTORS Patented Jan. 11, 1949

2,458,568

UNITED STATES PATENT OFFICE 2,458,568

POTATO SEED CUTTER

John A. Cummings and Frank B. Cummings, Bangor, Maine; said Frank B. Cummings assignor to said John A. Cummings Application March 19, 1948, Serial No. 15,904

2 Claims. (Cl. 146—78)

This invention relates to machines for cutting seed potatoes into several parts or pieces preparatory to planting. It is a well known fact that in most instances a potato of the average size is so large that the season it remains in the soil as the seed is not sufficiently long to convey all the vitality of the seed into the new potatoes raised from the original one, and for said reason it is a great wasting of seed potatoes to plant them whole. The object of my invention, therefore, is to provide a power-operated machine by which seed potatoes may be properly cut in relatively large quantities per day.

Another object of this invention is the provision of a power-operated machine for cutting potatoes which employs both stationary vertical knives for longitudinally halving the potatoes and vertical reciprocable blades for transversely dividing the potatoes.

Yet another object of this invention is the provision of a potato cutting machine wherein the potatoes fed to the machine are channelized and directed one at a time in each channel first to the vertical stationary knives and thence to the reciprocating blade to complete the slicing of the potato as desired before discharge from the machine.

A further object of this invention is the provision of a potato cutting machine having adjustable centering means carried by the bed of the machine for insuring the proper positioning of the potatoes relative to the stationary knives.

A still further object of this invention is the provision of a potato cutting machine having a dispensing drum for selectively and simultaneously supplying potatoes to a channelized bed, which dispensing drum is driven by a motor mounted on the frame of the machine and which dispensing drum is also operatively and adjustably connected to the vertical blade for automatically reciprocating the blade.

Yet another object of the invention is the provision of a potato cutting machine wherein the means adjustably connected to the dispensing drum and to the movable vertical blades simultaneously reciprocates the blades vertically and actuates potato directing fingers longitudinally, which fingers are disposed through channels in the bed of the machine.

Other objects and advantages reside in the details of construction and operation as more fully hereinafter described and claimed, reference being had to the accompanying drawings forming part hereof, wherein like numerals refer to like parts throughout, and in which:

Figure 5 is a fragmentary transverse vertical sectional view taken substantially on the plane of section line 5—5 of Figure 2;

Figure 6 is a fragmentary transverse vertical sectional view taken substantially on the plane of section line 6—6 of Figure 4;

Figure 7 is a fragmentary transverse vertical sectional view taken substantially on the plane of section line 7—7 of Figure 4; and Figure 8 is a fragmentary perspective view of the discharge end of the machine showing the spaced relationship of the vertical stationary knives to the vertical reciprocable blade.

Figures 1, 2:
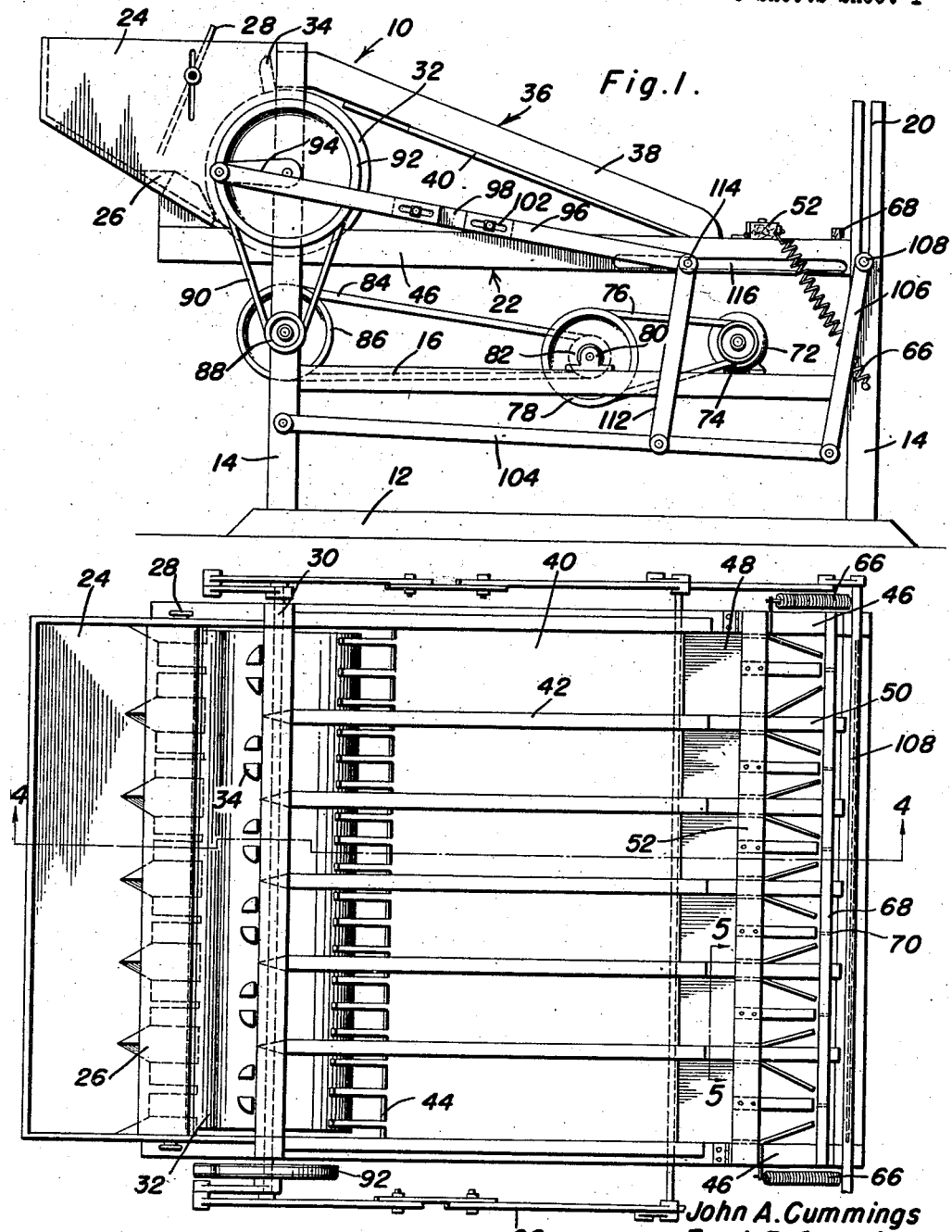
Figure 1 is a side elevational view of the potato cutting machine in total assembly.
Figure 2 is a top plan view of the potato cutting machine.
Figure 3:
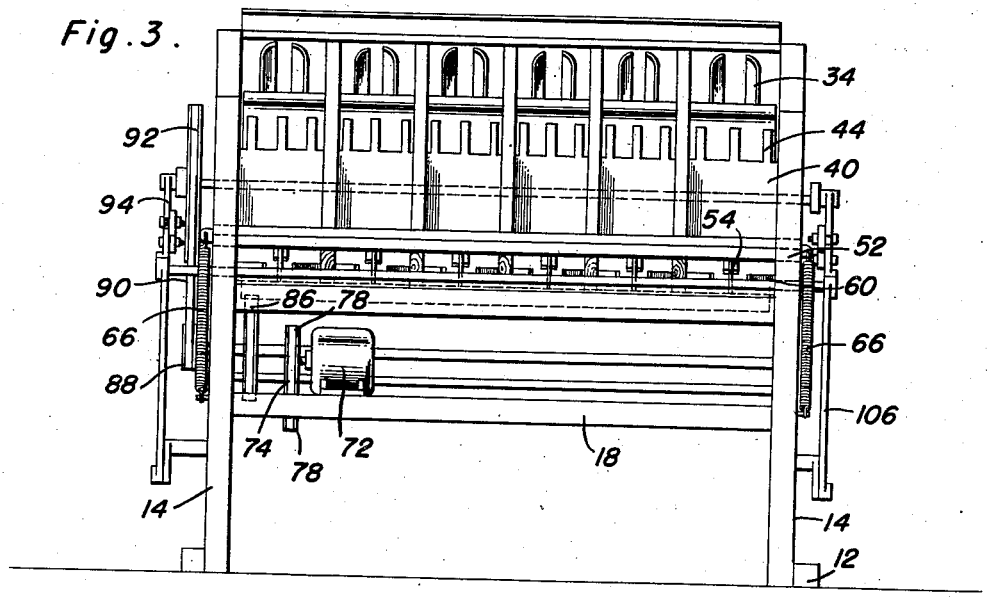
Figure 3 is a rear elevational view of the potato cutting machine.
Figure 4:
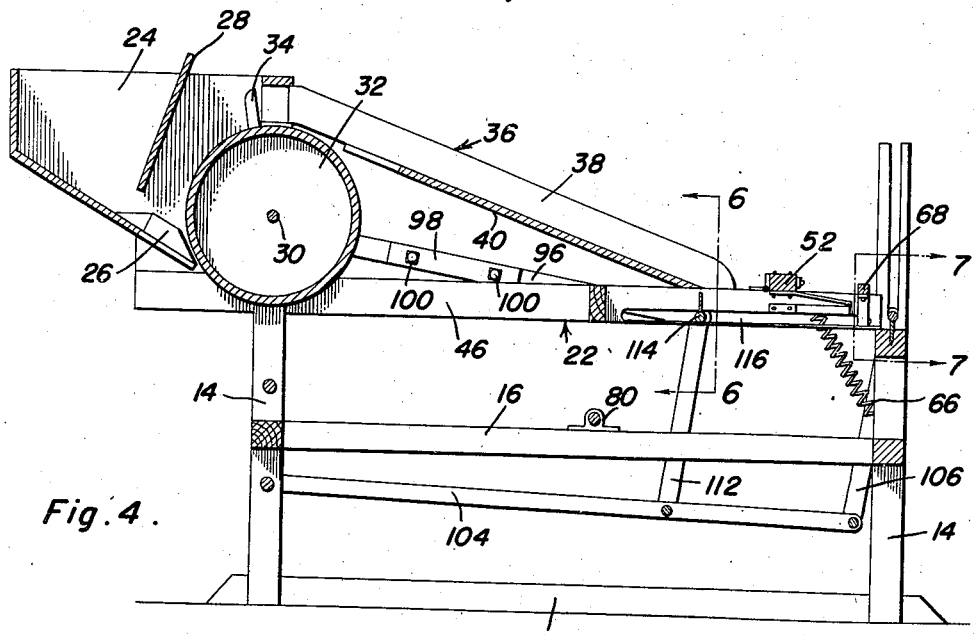
Figure 4 is a longitudinal vertical sectional view taken substantially in the plane of section line 4—4 of Figure 2.

Generally indicated at 10 is the potato cutting machine which comprises a frame having a base member 12 to which is secured a pair of vertical supports 14, suitable longitudinal brace members 16, and suitable transverse members 18 intermediate the extremities of the supports 14. The vertical supports 14 at the discharge end of the machine are provided with vertical slots 20, the significance of which will be set forth hereinafter. Supported on the vertical supports 14 adjacent the bottom of the slots 20 is a horizontal bed portion 22.

Suitably mounted to the bed portion 22 and the vertical supports 14 is a conventional hopper 24, to the inner inclined bottom of which is secured a plurality of transversely spaced longitudinal bars 26 which are preferably tapered at both ends and which form channeled passages between the bars. Transversely across the hopper and rotatably journaled in the sides thereof adjacent the top is a paddle 28 which is spaced from the inclined bottom of the hopper and is adjustable. By rotating the paddle 28 to a desired position, the size of the potatoes entering the channels in the hopper may be regulated.

Extending transversly of the open end of the hopper 24 is a shaft 30 journaled through suitable apertures in the vertical supports 14 which support and form the axis of rotation of a dispensing drum 32. To the periphery of the drum are secured a plurality of longitudinally spaced fingers 34. As many fingers are provided as there are channels in the hopper. It will readily be seen that as the dispensing drum 32 is rotated, the fingers 34 will pass through the channels in the hopper and lift up potatoes and transport them to the top end of a downwardly inclined chute 36, the top end of this chute 36 being supported by the vertical supports 14 immediately above the dispensing drum 32, with its bottom end resting on the bed portion 22.

The chute 36 is provided with a pair of side guards 38 and a base 40, upon which base is secured a plurality of spaced longitudinal upright bars 42 which are preferably tapered at their top ends. The passageways between these bars 42, therefore, constitute channels for the potatoes to pass through. The top end of the base 40 is preferably provided with a series of transverse apertures 44 for allowing dirt to fall through the chute which may accidentally have been picked up with the potatoes.

The bed portion 22 is provided with a pair of spaced longitudinal side members 46 and a base 48, which base at the discharge end of the machine 10 is provided with a plurality of spaced longitudinal bars 50 in alignment with the bars 42 of the chute 36. Adjustably and hingedly secured to the side members 46 and extending transversely across the bed portion 22 and overlying the base portion 48 thereof is a bar 52 which supports the means for centering the potatoes passing through the channels. This centering means consists of vertical springs 54 depending from the transverse bar 52 and disposed within each channel, the springs 54 being secured to the transverse bar 52, as shown in Figure 5, by appropriate screws 56 and nuts 58. Beneath each spring member 54 a pair of angulated springs 60 are provided which are removably secured to the longitudinal bars 50 by means of appropriate screws 62 and nuts 64. The transverse bar 52 is additionally resiliently secured to the forward vertical support 14 by means of springs 66.

Extending transversely across the bed and supported on the longitudinal bars 50 and the side members 46 is a bar 68 from which depends a plurality of spaced knives 70, each of which stationary knives 70 is disposed in a channel in front of the centering springs 54 and 60.

Secured to the transverse brace member 18 beneath the bed portion 22 is a motor 72, to the shaft of which is secured a pulley 74 around which is entrained an endless web 76 which operatively engages a second pulley 78 rotatably mounted on the brace member 18, as shown at 80. Concentric with and adjacent to the pulley 78 is a further reduced pulley 82 around which is entrained an endless web 84 operatively connected to another pulley 86, the shaft of which pulley 86 is rotatably mounted on the vertical support 14. This pulley shaft further carries a reduced pulley 88 around which is entrained another endless web 90 operatively engaging a further pulley 92 carried on the dispensing drum 32.

Secured to the shaft of the dispensing drum 32 is a crank arm 94 whose free end is pivoted to a longitudinal adjustable link 96. The link 96 is actually a split link whose length may be adjusted by a bar 98 having screws 100 extending therefrom. Those screws are journaled through slots 102 provided in the link 96. Suitable nuts engage the screws to fix the length of the adjusted link 96 at a desired position.

A pair of longitudinal rods 104 are provided which are terminally pivoted to the rear vertical supports 14 and a pair of vertical pitmans 106. The pitmans 106 are in turn pivotally secured to a rod 108 which is journaled in the slot 20 transversely of the bed portion 22 and from which depends a reciprocable blade 110.

Intermediate the ends of the rods 104 and pivoted thereto, a further pair of pitmans 112 are provided which are generally vertically disposed and are in turn pivotally connected to the adjustable link members 96.

Operatively connected to the pitmans 112 and the adjustable link members 96 is a transverse shaft or rod 114 which extends through a pair of longitudinal slots 116 provided in the side members 46 of the bed portion 22. Removably secured as at 118 to the transverse rod 114 is a plurality of spaced upstanding potato-directing members or fingers 120 which potato-directing fingers are disposed in the channels of said bed.

In practical operation, the motor drives the dispensing drum which, by virtue of the fingers 34, lifts the potatoes from the bottom of the hopper 24 and deposits them on the downwardly inclined chute 38, causing them to travel through definite channels. The potatoes then drop on to the bed portion 22 where they are pushed forward to the discharge end of the bed by the fingers 120. The potatoes passing through the channels in the bed portion 22 are centered by the springs 54 and 60. The potatoes are then longitudinally halved by the stationary vertical knives 70 and are thereafter transversely divided by the reciprocating blade 110. Thus, it will be seen that the fingers 120 which push the potatoes along on the bed portion 22 are actuated simultaneously with the reciprocating blade 110.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A potato seed cutter comprising a frame having a bed, a plurality of longitudinal bars on said bed forming channels for feeding potatoes in separate paths across said bed, a dispensing drum for selectively and simultaneously supplying potatoes to said channels, a motor mounted on said frame, means operatively connecting said motor to said dispensing drum for driving said drum, a potato-directing finger slidably mounted in said bed extending vertically into each of said channels, a stationary vertical knife in each channel supported by said bed for longitudinally halving potatoes passing thereby, adjustable centering means in each channel carried by said bed intermediate the directing finger and the stationary knife, slots in said frame beyond said stationary knives at the discharge end of said channels, a vertical blade slidably mounted in said slots extending transverse all of said channels for transversely dividing said potatoes, and adjustable means operatively connecting said blade to said dispensing drum for reciprocating said blade in said slots, said adjustable centering means including a bar extending transversely of said bed and overlying said channels, springs removably secured to the ends of said bar and to said frame, vertical spring members depending from said bar and extending into said channels, and angulated horizontal spring members depending from said channel bars and also extending into said channels, said reciprocating means including crank arms rotatably mounted on said drum, adjustable connecting links pivotally secured to said crank arms, longitudinal slots in said bed, a rod extending transversely of said channels and extending through said slots pivotally secured at its extremities to said adjustable links, a pair of pivotal arms carried by said frame, pitmans connecting said pivotal arms to said blade, and link means connecting said transverse rod to said pivotal arms for simultaneous actuation of said blade and said transverse rod.

2. The combination of claim 1 wherein said transverse rod carries longitudinally spaced potato directing fingers disposed in said channels.

JOHN A. CUMMINGS.
FRANK B. CUMMINGS.

REFERENCES CITED

The following references are of record in the file of this patent:

UNITED STATES PATENTS

| Number | Name | Date |
|---|---|---|
| 1,030,154 | Barnebey | June 18, 1912 |
| 1,046,551 | Cass | Dec. 10, 1912 |
| 1,095,620 | Blair | May 5, 1914 |
| 1,118,923 | Cummings | Dec. 1, 1914 |
| 1,347,058 | Schroeder | July 20, 1920 |
| 1,487,905 | Walton | Mar. 25, 1924 |
| 1,719,669 | Novak | July 2, 1929 |
| 1,865,986 | White | July 5, 1932 |
| 1,990,774 | Butler | Feb. 12, 1935 |
| 2,232,089 | Wool | Feb. 18, 1941 |
| 2,299,567 | Cummings | Oct. 20, 1942 |

FOREIGN PATENTS

| Number | Country | Date |
|---|---|---|
| 449,613 | Great Britain | June 29, 1936 |